United States Patent Office 2,934,559
Patented Apr. 26, 1960

2,934,559

PREPARATION OF DIOL DICARBAMATES AT SUBATMOSPHERIC PRESSURE

Sidney Beinfest and Phillip Adams, Berkeley Heights, and Joseph Halpern, New Providence, N.J., assignors to Berkeley Chemical Corporation, Berkeley Heights, N.J., a corporation of New Jersey No Drawing. Application March 1, 1956
Serial No. 568,715

5 Claims. (Cl. 260—482)

This invention relates to new and useful improvements in the preparation of organic carbamates, particularly alkanediol dicarbamates, some of which are novel chemicals.

This application is a continuation-in-part of Serial No. 560,856, filed January 23, 1956, now Patent No. 2,837,560.

Alkanediol dicarbamates such as butane 1,3 diol dicarbamate and 2-methyl-2-n-propyl-propane 1,3 diol dicarbamate have been finding increasing utility in the plastic industry and for medicinal purposes.

These materials have been prepared in general by reacting a diol with 2 moles of phosgene and then ammonolysis of the bis (chloro carbamate). They have also been prepared by the direct reaction of urea with diols by the utilization of an excess of the latter in the presence of an inert diluent having a boiling point above 200° C.

All of these processes are thus characterized in general by excessive costs and unsatisfactory yields. Problems in the purification of the desired materials also arise because of side reaction products. Simple examples of side products are alkyl carbonates, allophanates and cyanuric acid.

It has now been found that organic carbamates, particularly alkanediol dicarbamates can be prepared more efficiently, in increased yields and with greater ease of purification by reacting an organic alcohol, e.g., an organic diol, particularly an alkanediol, with a lower aliphatic usually alkyl carbamate at a maximum temperature of 180° C. but preferably a maximum of 170° C., at subatmospheric pressure, in the absence of extraneously added diluent, and utilizing an aluminum alkoxide as the catalyst. The absolute pressure is so maintained as to keep the system boiling vigorously. The resultant alkanol produced is continuously evolved and thus essentially completely removed from the system. Since the alkanol is in a relatively pure form it is available for reuse. This operation thus makes possible the utilization of a much greater charge for a given size reactor.

The maximum temperature utilized is 180° C., preferably 170° C., with an operating range of 140° C. to 155° C., especially preferred and desirable. Data demonstrate that at higher temperatures degradation reactions occur.

It is also essential that the mixture be kept boiling vigorously within the temperature specified and this can be done by reducing the pressure until all the alkanol has been evolved, e.g., with ethyl carbamate an initial pressure of 250 mm. is used, with butyl carbamate 100 mm. The final pressure is in the region of 15-20 mm.

The equation for the reaction is illustrated below for the preparation of butane 1,3 diol dicarbamate from the corresponding diol and ethyl carbamate.

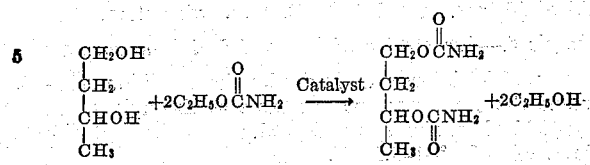

Typical organic monohydroxy alcohols that can be utilized in the preparation of organic monocarbamates by the process of this invention are benzyl alcohol, stearyl alcohol, methallyl alcohol and cyclohexanol.

The alkanediols that can be utilized are those fitting into the general formula

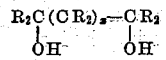

where R is a radical selected from the group consisting of hydrogen, alkyl, cyclic or aryl radicals and x is any number including zero. Where x is 2 or more an alkylene, ethynyl group or a cyclic group can be used. Typical diols used are butane 1,3 diol, and 2-methyl-2-n-propyl propane 1,3 diol. Other examples are listed below. It is to be understood that the R groups can be the same or different on each of the carbon atoms.

The lower aliphatic carbamates utilized include ethyl carabamte, n-propyl, n-butyl, 2-methoxy ethyl carbamates. These carbamates are usually derived from lower alkanols having a boiling point in the range of 64°–160° C. The term "lower aliphatic carbamate reactant" refers to a carbamate whose aliphatic or alkyl nucleus is converted during the course of the reaction, as shown by the equation, to an alcohol of lower boiling point than the original alcohol reactant. Normally, but not necessarily because of isomers, etc., the carbamate reactant thus is also of lower carbon number.

The quantities of reactants employed follows essentially the stoichiometric relations of the equation.

The catalysts employed are the aluminum alkoxides, or precursors, of alkanols boiling in the 64°–160° C. range, e.g., aluminum isopropoxide, aluminum n-butoxide, whose preparation is well known. Alcohols other than alkanols can also be employed. The catalysts are often insoluble in the initial mixture but dissolve slowly as the reaction proceeds and are used in an amount of about 0.005 to 0.1 mole or more/mole reactant alcohol.

This invention will be better understood by reference to the following examples of the preparation of the indicated compounds according to the process of this invention.

*Example 1.—Preparation of 2-methyl-2-n-propyl propane, 1,3 diol dicarbamate*

Into a 3-necked flask equipped with a small 10" column were charged dry 66.5 g. (0.5 moles) 2-methyl-2-n-propyl propane 1,3 diol, 112 g. (1.26 moles) ethyl carabamate, 2 g. of aluminum isopropylate.

The pressure was lowered to 250 mm. and at a temperature of 142° C., the alcohol was removed as soon as it was formed. The temperature was maintained at 150° C. by lowering the pressure. The reaction was completed after 4½ hours, the final pressure being about 20 mm. The yield of product was 61 g. of a M.P. 103–105° C.

Example 2

Substitution of n-butyl carbamate in the reaction of Example 1 also necessitated a lower pressure, e.g. 100 mm. to maintain the temperature of 150° C. The final pressure was 20 mm. and from the same quantities of reactants a yield of 63 g. was obtained.

Example 3

A similar system as Example 1 was employed except that the aliphatic carbamate reactant was 2-methoxy ethyl carbamate and the initial pressure was 85 mm. A yield of 55 gms. of 102–104° C. M.P. was obtained.

Example 4.—Preparation of butane 1,3 diol dicarbamate

Butane 1,3 diol was utilized with the conditions similar and the other reactants the same as Example 1. A good yield of the above named product was obtained with a M.P. of 148.4°–149.5° C.

Example 5.—Preparation of 2-butene 1,4 diol dicarbamate 0.5 moles (44 g.) 2-butene 1,4 diol, 110 g. (1.23 moles) of ethyl carbamate and 3 g. aluminum butoxide were heated to 150° C. and the evolved alcohol was removed at a pressure of 150 mm. After 6 hours the reaction was finished. The final pressure was 20 mm. and the temperature was 150° C. A good yield was obtained and the product had a M.P. of 131°–133° C.

Example 6.—Preparation of pentane 1,5 diol dicarbamate

Pentane 1,5 diol (0.5 m.) 52 g., ethyl carbamate (1.3 m.) 117 g., aluminum isopropoxide 2 g. were charged into a flask. Alcohol was removed at a pot temperature of 150° C. and a pressure of 250 mm. After 4 hours the reaction was completed at a pressure of 50 mm. and a pot temperature of 150° C. The yield was 65 g. and M.P. 160°–163° C.

Example 7.—Preparation of stearyl carbamate 270 g. (1 mole) of stearyl alcohol, 112 g. (1.26 moles) of ethyl carbamate and 2 g. of aluminum isopropylate are charged to a reactor utilizing the same conditions as Example 1. Good yeilds of stearyl carbamate having a M.P. of 95° C. after recrystallization are obtained.

The organic, e.g., alkanediol dicarbamates dissolve with difficulty in cold water, alcohol or xylene, but depending on molecular weight readily in these media when hot.

This process is also applicable to the preparation of polycarbamates from polyols.

The advantages of this invention will be apparent to the skilled in the art. High yields of relatively pure products are obtained with a minimum of degradation and a great saving in equipment sizes.

It is understood that this invention is not limited to the specific examples which have been offered merely as illustrations and that modifications may be made without departing from the spirit of the invention.

What is claimed is:

1. In a process for preparing an alkane diol dicarbamate selected from the group consisting of butane 1,3 diol dicarbamate, 2-methyl-2-n-propyl propane 1,3 diol dicarbamate, pentane 1,5 diol dicarbamate and 2-butene 1,4 diol dicarbamate by reacting the corresponding diol with a lower alkyl carbamate in the presence of an aluminum alkoxide, in the absence of added, extraneous diluent, the improvement which comprises carrying out the reaction at a maximum temperature of 170° C. and continuously maintaining the reaction pressure below atmospheric so that the reaction system boils vigorously whereby all the resultant aliphatic alcohol produced is continuously evolved and removed from the reaction system.

2. In a process for preparing butane 1,3 diol dicarbamate by reacting butane 1,3 diol with ethyl carbamate in the presence of an aluminum alkoxide in the absence of added extraneous diluent, the improvement which comprises carrying out the reaction at an operating temperature in the range of 140° to 155° C. and continuously maintaining the reaction pressure below atmospheric so that the reaction system boils vigorously whereby all the resultant aliphatic alcohol produced is continuously evolved and removed from the reaction system.

3. In a process for preparing 2-methyl-2-n-propyl propane 1,3 diol dicarbamate by reacting 2-methyl-2-n-propyl propane 1,3 diol with butyl carbamate in the presence of an aluminum alkoxide in the absence of added extraneous diluent, the improvement which comprises carrying out the reaction at an operating temperature in the range of 140° to 155° C. and continuously maintaining the reaction pressure below atmospheric so that the reaction system boils vigorously whereby all the resultant aliphatic alcohol produced is continuously evolved and removed from the reaction system.

4. In a process for preparing pentane 1,5 diol dicarbamate by reacting pentane 1,5 diol with ethyl carbamate in the presence of an aluminum alkoxide in the absence of added extraneous diluent, the improvement which comprises carrying out the reaction at an operating temperature in the range of 140° to 155° C. and continuously maintaining the reaction pressure below atmospheric so that the reaction system boils vigorously whereby all the resultant aliphatic alcohol produced is continuously evolved and removed from the reaction system.

5. In a process for preparing 2-butene 1,4 diol dicarbamate by reacting butene 1,4 diol with ethyl carbamate in the presence of an aluminum alkoxide in the absence of added extraneous diluent, the improvement which comprises carrying out the reaction at a maximum temperature of 170° C. and continuously maintaining the reaction pressure below atmospheric so that the reaction system boils vigorously whereby all the resultant aliphatic alcohol produced is continuously evolved and removed from the reaction system.

References Cited in the file of this patent

UNITED STATES PATENTS 2,433,866    Rehberg et al. _____ Jan. 6, 1948

FOREIGN PATENTS 565,319    Germany _____ Dec. 1, 1932

OTHER REFERENCES

Morton; Laboratory Technique in Organic Chemistry (McGraw-Hill), 1938, p. 99.

Groggins; Unit Processes in Organic Synthesis, pp. 616–9 (1952).